(12) United States Patent
Shen et al.

(10) Patent No.: US 8,417,362 B2
(45) Date of Patent: *Apr. 9, 2013

(54) ADVANCED PROCESS CONTROL FOR SEMICONDUCTOR PROCESSING

(75) Inventors: Hsueh Chi Shen, Hsinchu (TW); Chun-Hsien Lin, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 601 days.

This patent is subject to a terminal disclaimer.

(21) Appl. No.: 12/426,690

(22) Filed: Apr. 20, 2009

(65) Prior Publication Data
US 2009/0248187 A1   Oct. 1, 2009

Related U.S. Application Data

(62) Division of application No. 11/689,050, filed on Mar. 21, 2007, now Pat. No. 7,534,725.

(51) Int. Cl.
*G05B 13/02* (2006.01)
*G06F 19/00* (2011.01)

(52) U.S. Cl.
USPC ................ 700/45; 700/28; 700/29; 700/44; 700/121

(58) Field of Classification Search ............. 700/28–29, 700/121, 44–45
See application file for complete search history.

(56) References Cited

U.S. PATENT DOCUMENTS

| | | |
|---|---|---|
| 4,493,745 A | 1/1985 | Chen et al. |
| 5,402,367 A | 3/1995 | Sullivan et al. |
| 5,503,707 A | 4/1996 | Maung et al. |
| 5,838,595 A | 11/1998 | Sullivan et al. |
| 6,254,457 B1 | 7/2001 | Perrin et al. |
| 6,448,097 B1 * | 9/2002 | Singh et al. ............... 438/16 |
| 6,567,717 B2 * | 5/2003 | Krivokapic et al. ......... 700/121 |
| 6,582,976 B2 | 6/2003 | Watanabe |
| 6,623,333 B1 | 9/2003 | Patel et al. |
| 6,630,360 B2 | 10/2003 | Christian et al. |
| 6,640,151 B1 * | 10/2003 | Somekh et al. ............ 700/121 |
| 6,645,781 B1 | 11/2003 | Jiang et al. |

(Continued)

FOREIGN PATENT DOCUMENTS

| | | |
|---|---|---|
| EP | 0445640 A2 | 9/1991 |
| EP | 0643344 A1 | 7/1993 |

OTHER PUBLICATIONS

Ling, Zhi-min et al., "In-Line Supervisory Control in a Photolithographic Workcell", Advanced Techniques for Integrated Circuit Processing, 1990, pp. 660-669, SPIE vol. 1392.

Dishon, G. et al., "Monitoring Choices of CMP Planarization Processes", CMP-MIC Conference, Feb. 1997, pp. 391-398.

*Primary Examiner* — Ronald Hartman, Jr.
(74) *Attorney, Agent, or Firm* — Haynes and Boone, LLP

(57) ABSTRACT

A computer comprising a recordable medium on which is stored instructions for at least one model-based, run-to-run controller routine is provided. The computer includes instructions to receive a first dataset regarding a first wafer after a first process, to determine a process parameter for the first process for a second wafer using the first dataset; and to determine a second process parameter for a second process for the first wafer using the first dataset. In an embodiment, the first process is an etch process. In an embodiment, the second process is a planarization process.

20 Claims, 5 Drawing Sheets

U.S. PATENT DOCUMENTS

| | | |
|---|---|---|
| 6,721,616 B1 * | 4/2004 | Ryskoski ................. 700/108 |
| 6,960,416 B2 | 11/2005 | Mui et al. |
| 6,961,636 B1 * | 11/2005 | Chong et al. ............. 700/121 |
| 7,047,099 B2 * | 5/2006 | Shanmugasundram et al. ................. 700/121 |
| 7,083,495 B2 | 8/2006 | Lin et al. |
| 7,089,075 B2 * | 8/2006 | Hasan ..................... 700/121 |
| 7,337,019 B2 * | 2/2008 | Reiss et al. .............. 700/21 |
| 7,373,216 B1 * | 5/2008 | Winkler et al. .......... 700/121 |
| 7,517,708 B2 * | 4/2009 | Deshpande et al. ...... 438/18 |
| 7,542,880 B2 * | 6/2009 | Good et al. .............. 702/194 |
| 2002/0165636 A1 * | 11/2002 | Hasan ..................... 700/121 |
| 2003/0074098 A1 * | 4/2003 | Cheung et al. .......... 700/121 |
| 2003/0199112 A1 * | 10/2003 | Shanmugasundram et al. ................. 438/17 |
| 2004/0267399 A1 * | 12/2004 | Funk ....................... 700/121 |
| 2006/0064188 A1 * | 3/2006 | Ushiku et al. ........... 700/96 |

* cited by examiner

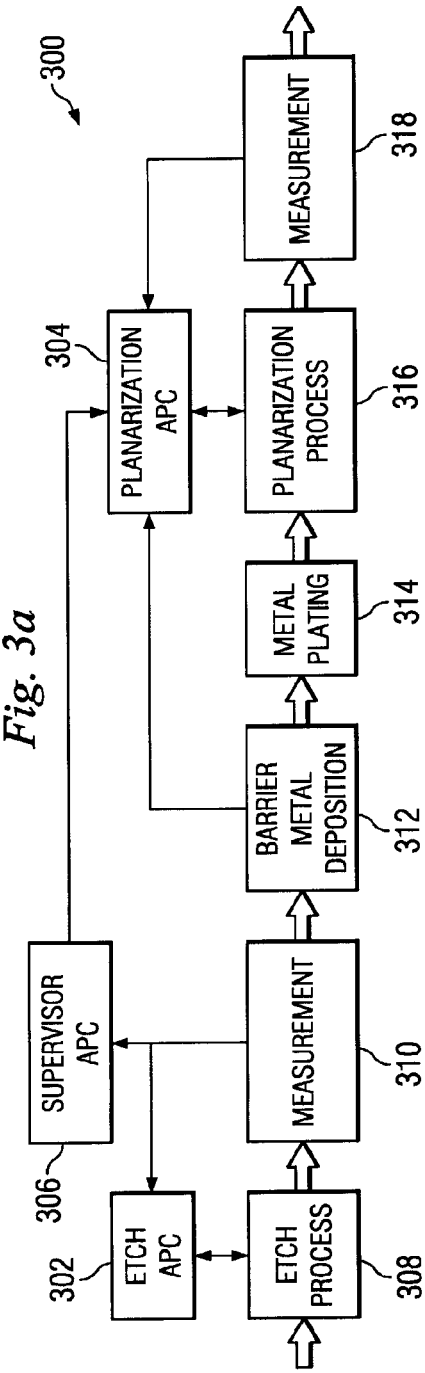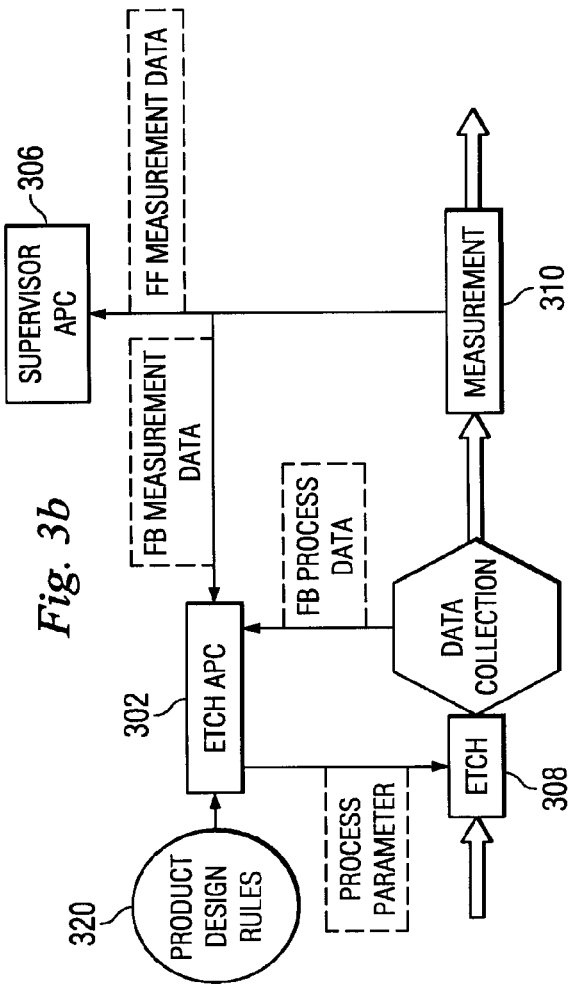
Fig. 3a
Fig. 3b

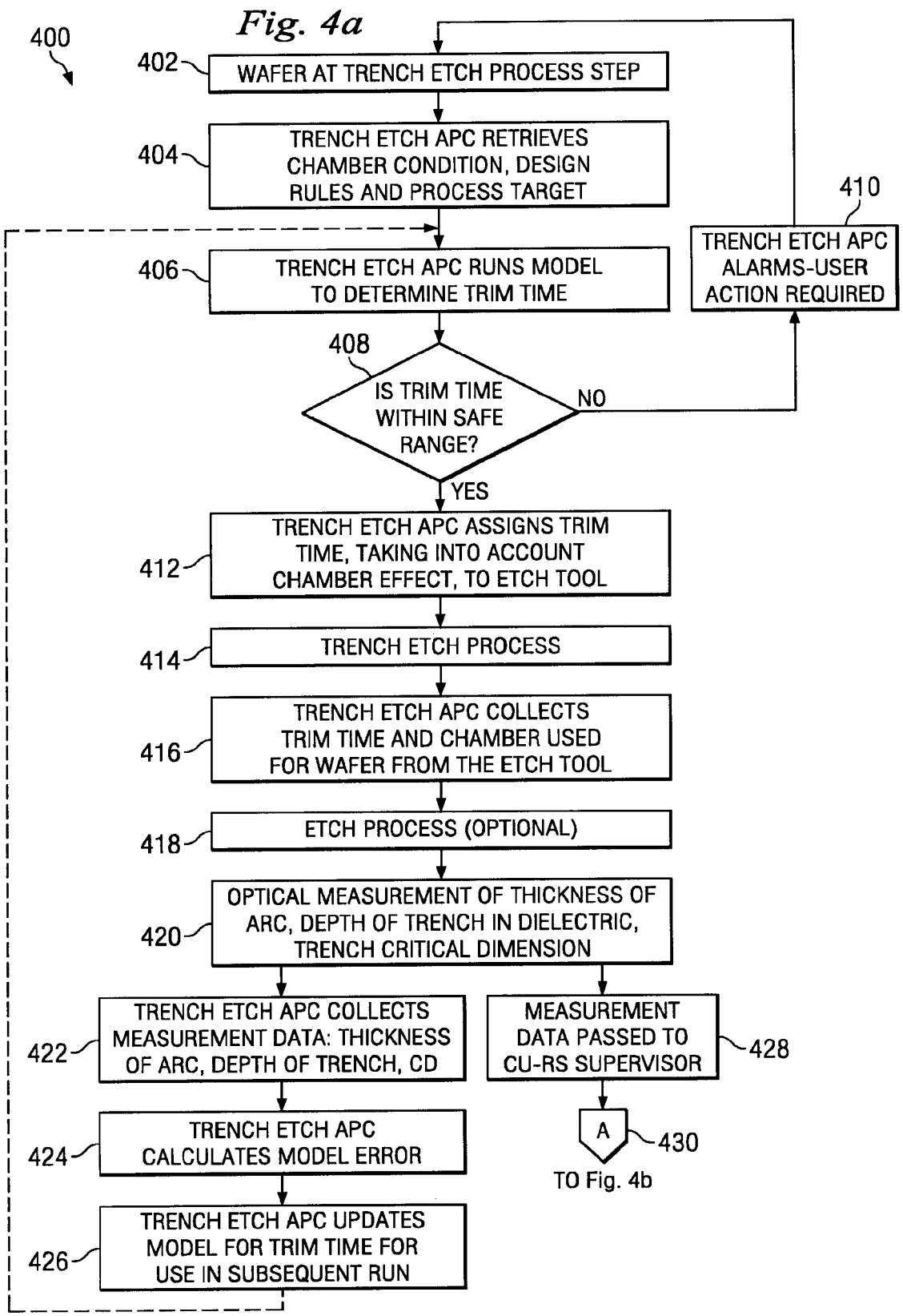

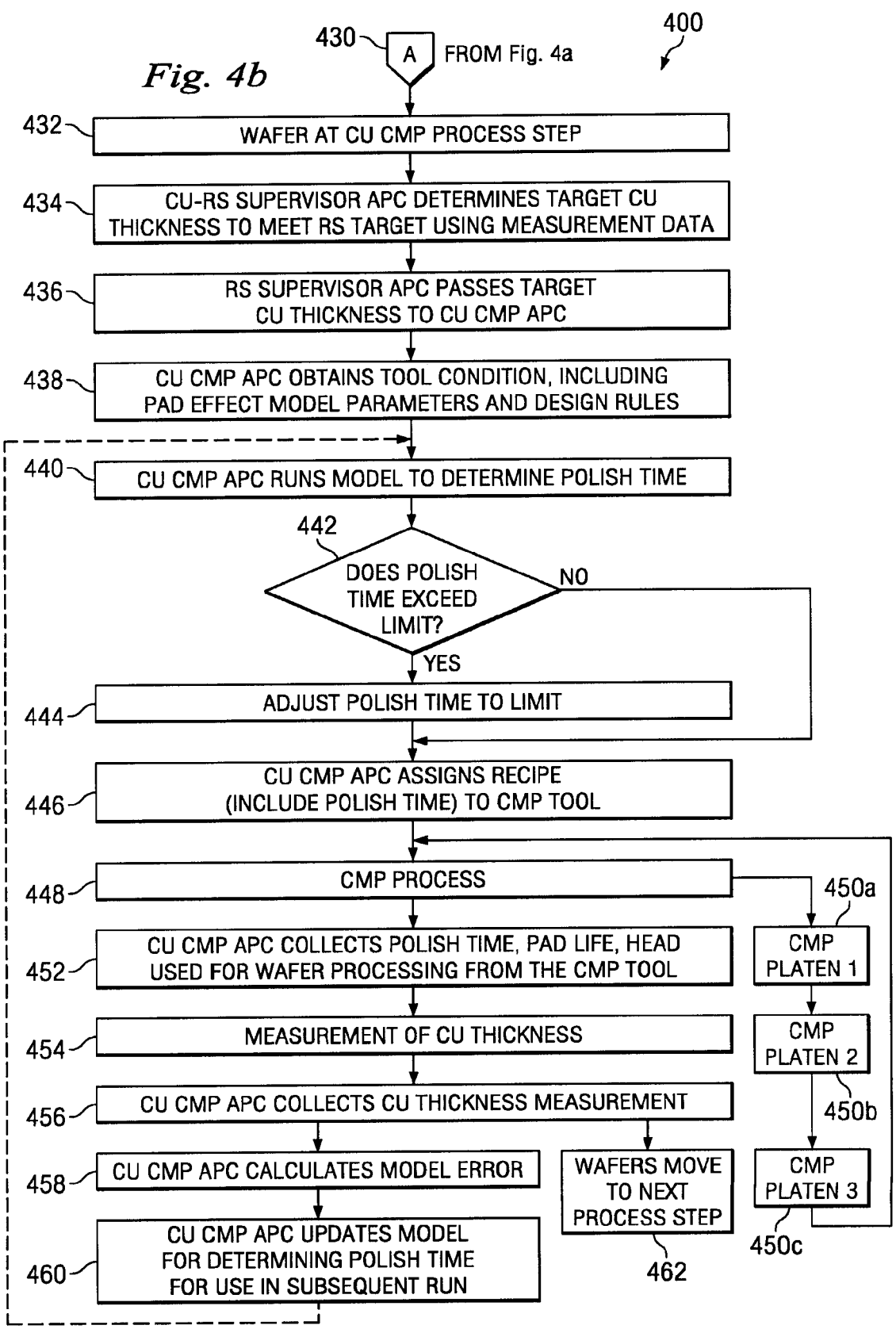

ADVANCED PROCESS CONTROL FOR SEMICONDUCTOR PROCESSING

CROSS REFERENCE

This application is a Divisional of U.S. patent application Ser. No. 11/689,050, filed Mar. 21, 2007, which is hereby incorporated by reference in its entirety.

BACKGROUND

The present disclosure relates generally to semiconductor fabrication, and more particularly, to semiconductor fabrication process control.

As performance requirements and throughput demands increase, semiconductor fabrication process control has become even more crucial. However, as process geometries decrease, such as from 13 µm to 90 nanometer, semiconductor manufacturers have struggled to keep process variations at an acceptable level. As such, the processes may suffer from losses in tool productivity, increased operator interaction, yield loss, and higher rework rates, all possibly leading to higher costs. Automated Process Control (APC), which may consist of models and feedback systems among other process control techniques, may help to alleviate some of the variations. However sufficient APC methods are lacking, especially for controlling parameters that are affected by multiple process steps.

The sheet resistance (Rs) of the copper interconnects is one of the parameters that semiconductor manufacturers have had difficulty in maintaining an acceptable variation. For processes such as those with 90 nanometer feature sizes, a copper Rs variation of less than 20% may be required. In addition to these demanding performance requirements, low-k performance goals for the process have, in some instances, required the omission of several etch stop layers compounding the difficulties controlling the copper interconnect processes. One solution to control sheet resistance using APC concerns control of only a single process step, specifically that of deposition of the copper seed layer and teaches controlling the profile of that layer. Another solution to control Rs using APC only concerns control of a CMP process to minimize Rs variation.

Accordingly, it would be desirable to provide process control absent the disadvantages discussed above.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 3a is a block diagram illustrating an embodiment of the method of process control of FIG. 2.

FIG. 3b is a block diagram illustrating an embodiment of the block diagram of FIG. 3a.

FIG. 3c is a block diagram illustrating an embodiment of the block diagram of FIG. 3a.

FIG. 3d is a block diagram illustrating an embodiment of the block diagram of FIG. 3a.

FIG. 4 (split into FIGS. 4a and 4b) is a flow chart illustrating an embodiment of the method of FIGS. 3a, 3b, 3c, and 3d.

DETAILED DESCRIPTION

The present disclosure relates generally to the fabrication of semiconductor devices, and more particularly, to process control of the fabrication of semiconductor devices. It is understood, however, that specific embodiments are provided as examples to teach the broader inventive concept, and one of ordinary skill in the art can easily apply the teaching of the present disclosure to other methods or apparatus. Also, it is understood that the methods and apparatus discussed in the present disclosure include some conventional structures and/or processes. Since these structures and processes are well known in the art, they will only be discussed in a general level of detail. Furthermore, reference numbers are repeated throughout the drawings for sake of convenience and example, and such repetition does not indicate any required combination of features or steps throughout the drawings.

Figure 1:
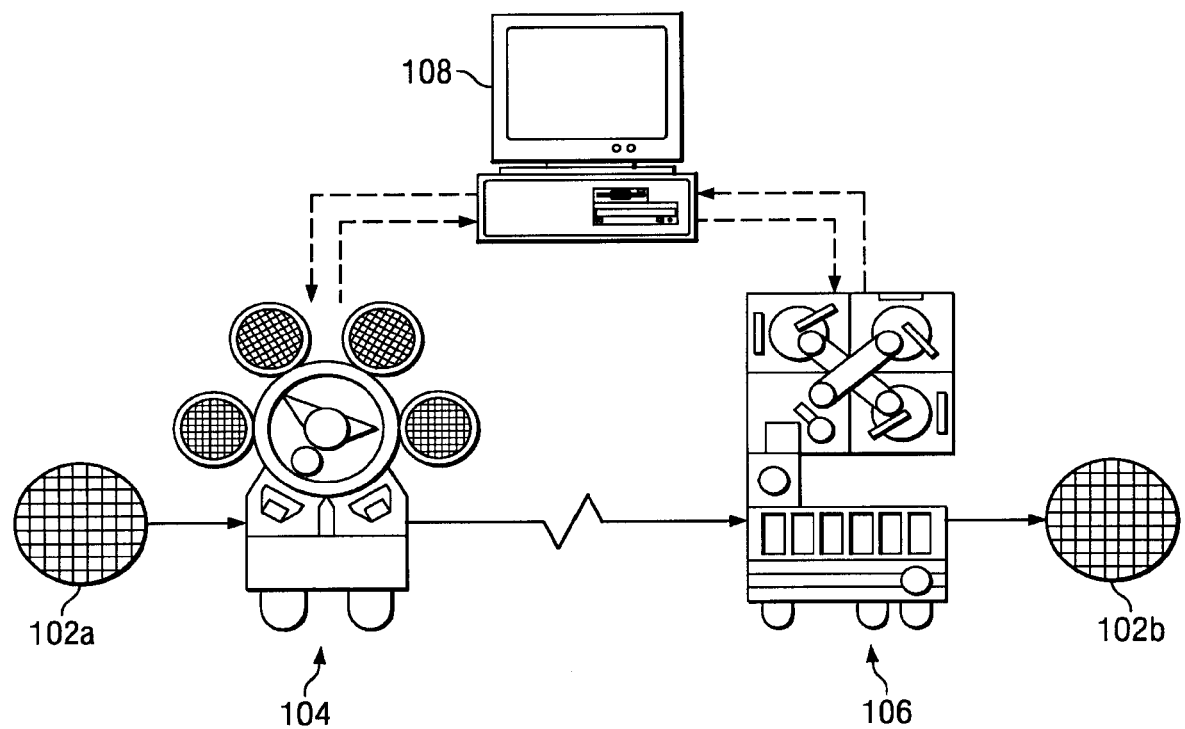
FIG. 1 is block diagram illustrating material and information flow in a portion of a semiconductor process.

Referring to FIG. 1, a flowchart illustrates a material process flow, illustrated as solid lines, and an information flow, illustrated as dashed lines. The material process flow includes the process steps for fabricating a semiconductor substrate, such as, for example, a wafer. A first wafer 102a and a second wafer 102b are illustrated, however, multiple wafers are likely to be processed grouped in lots, as such, the reference to a wafer in the singular in the present disclosure does not by necessity limit the disclosure to a single wafer, but may be illustrative of a lot including a plurality of wafers, a plurality of lots, or any such grouping of material. The flowchart further illustrates two tools, an etcher 104 and a planarization tool, a chemical mechanical polish (CMP) tool 106. In an embodiment, the CMP tool 106 includes 4 heads, each operable to hold a wafer, and 3 platens upon which polishing pads are placed; one head carrying a wafer to each of the three platens with each platen removing a portion of the target layer. In an embodiment, the etcher 104 includes multiple chambers and is operable to perform an etch process such as, etching a trench in a dielectric, in each of the chambers. The etcher 104 can receive information from and transfer information to a computer 108. The CMP tool 106 also can receive information from and transfer information to the computer 108. The data transferred may include, for example, commands, process parameters such as those parameters used in the process recipe, measurement data, process data such as the history of processes ran including specific tool or tool sector used and process parameters used, and/or equipment status. The computer 108 includes a controller operable to monitor and affect the conditions of the material process flow and memory for storing computer instructions consistent with the steps and methods discussed in greater detail below. The computer 108 is operable to perform actions including manipulating information (including manipulating information using a model), receiving information, storing information, and transferring information. In an embodiment, the computer 108 may include multiple computers. In an embodiment, the computer 108 may include equipment or code embedded in a process tool, such as, for example the etcher 104 or the CMP tool 106. The computer 108 may further include one or multiple user interfaces. In an embodiment, the computer 108 may be connected to a plurality of additional semiconductor processing tools, such as, for example, metrology tools, deposition tools, and electroplating tools.

Figure 2:
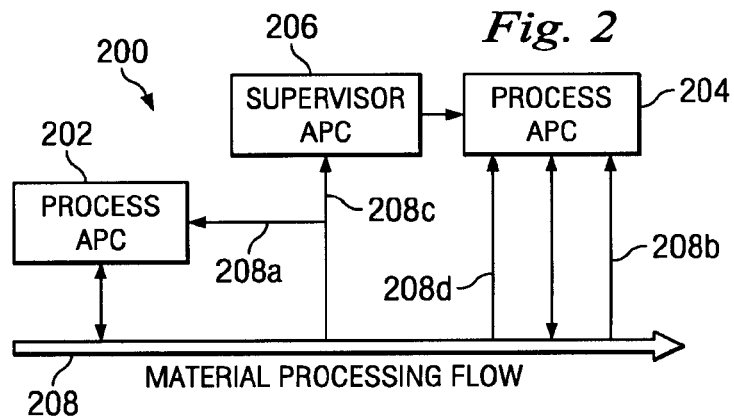
FIG. 2 is a block diagram illustrating a method of process control for semiconductor fabrication.

Referring now to FIG. 2, a method of process control 200 for a plurality of process steps for semiconductor wafer fabrication is illustrated. The process control method 200 includes three APC systems, a first Process APC 202, a second Process APC 204, and a Supervisor APC 206, that provide process control for a material process flow 208. In an embodiment, the first Process APC 202, the second Process APC 204, and/or the Supervisor APC 206 are included in a computer, such as the computer 108, described above with reference to FIG. 1. The material process flow 208 is illustrative of the process steps for the fabrication of semiconductor wafers and may include tools such as the etcher 104 and the CMP tool 106, described above with reference to FIG. 1. The first Process APC 202 sends information to and receives information from the material process flow 208. The Supervisor APC 206 receives information from the material process flow 208 and sends information to the second Process APC 204. The second Process APC 204 sends information to and receives information from the material process flow 208. This exchange of information in the process control method 200 includes the exchange of feedback data and feed-forward data. Feedback data includes, for example, the data transferred on paths denoted by reference numbers 208*a* and 208*b*; feed-forward data includes, for example, data transferred on paths denoted by reference numbers 208*c* and 208*d*. The feed-forward data may be used to set wafer specific process parameters and/or process targets for subsequent processing of the wafer. For example, feed-forward data includes data, including measurement data, on the wafer 102*a* that is used to determine subsequent process parameters and/or targets for the wafer 102*a*. The feedback data may be used to determine process parameters and/or process targets for the processing of subsequent wafers. For example, feedback data includes data from the processing of wafer 102*a* used to determine the process parameters for wafer 102*b*. In an embodiment, the first Process APC 202 and the second Process APC 204 may pass information to and from the material process flow 208 at additional process steps. In an embodiment, the Supervisor APC 206 may send information to and receive information from additional process APC systems or process steps in the material process flow 208.

Referring now to FIGS. 3*a*, 3*b*, 3*c*, and 3*d*, a process control method 300 is illustrated; the process control method 300 is an embodiment of the process control method 200, described above with reference to FIG. 2. The material process flow illustrated is a portion of the back-end-of-the-line (BEOL) fabrication of metal interconnects and includes an etch process 308, a post-etch measurement 310, a barrier/seed metal deposition process 312, a metal plating process 314, a planarization process 316, and a post-planarization measurement 318. Additional processing steps, as known in the art, may be included before, after, and/or among the illustrated steps. In an embodiment, the process control method 300 may be utilized for a single damascene process, a dual damascene process, or a variety of other interconnect fabrication methods, as known in the art. The etch process 308 and the planarization process 316 are controlled in part by three APC systems: an Etch APC 302, a Planarization APC 304, and a Supervisor APC 306, though additional process controls may be present. The Etch APC 302 is an embodiment of the first Process APC 202, as described above with reference to FIG. 2. The Planarization APC 304 is an embodiment of the second Process APC 204, also described above with reference to FIG. 2. The Supervisor APC 306 is an embodiment of the Supervisor APC 206, also described above with reference to FIG. 2.

Referring in particular to FIGS. 3*a* and 3*b*, the Etch APC 302 of the process control method 300 is illustrated in detail. In an embodiment, the wafer just prior the etch process 308 has photoresist deposited on a dielectric layer allowing the etch process 308 to etch a feature, such as a trench, in the dielectric. The Etch APC 302 determines an etch process parameter that, when included in a process recipe in the etch process 308, will allow the etch process 308 to create a feature with approximately the target profile. The process parameter may include parameters such as, for example, trim time of the photoresist, chemical flowrate, and/or etch time. In an embodiment, the target profile is input by a user. In an alternative embodiment, the target profile is delivered to the Etch APC 302 by the Supervisor APC 306. The target profile includes the target feature dimensions, such as trench depth and trench critical dimension (width). The etch process parameter may be determined by the Etch APC 302 using a model-based controller. In an embodiment, the etch process parameter is determined by the Etch APC 302 using a model-based, run-to-run controller. In an embodiment, the controller includes a part-effect model that may take into account the design rules for the wafer. The design rules may include the circuit pattern density and specific requirements for performance of the product being fabricated. In an embodiment, the controller includes a tool-effect model that may take into account process deviations particular to the tool. In a further embodiment, the tool-effect model may include a chamber specific model for a multiple chamber etch tool. The Etch APC 302 sends the determined etch process parameter to the etch process 308, for example, to an etch tool such as the etcher 104, as described above with reference to FIG. 1, to be used in processing the wafer.

The Etch APC 302 periodically updates the models used to determine the etch process parameter for the etch process 308 using feedback data from the material process flow including feedback data from the etch process 308 and the post-etch measurement 310. The feedback data from the etch process 308 may include process data, such as, the etch process parameter and the tool parameters used, including a designation of the tool sector in which the processing occurred such as, for example, a designation of the chamber performing the etch. The feedback data from the post etch process measurement 310 may include measurements of the etched feature and/or other layers present on the wafer. The post-etch measurement 310 may include an optical measurement. In an embodiment, the measurement is performed by the etch tool performing the etch process 308. In an alternative embodiment, the measurement is done by a separate tool, such as, for example a spectroscopic critical dimension (SCD) metrology tool. Upon receiving the feedback data, the Etch APC 302 determines the difference between the feedback data, which illustrates the actual process output, and the model-predicted process output. The Etch APC 302 uses this difference to update the model for use in determining an etch process parameter for a subsequent wafer. In an embodiment, an exponentially weighed moving average (EWMA) is used to filter outlier data. The difference in the predicted and actual output may be a result of process drift due to, for example, the aging of the etcher chamber, preventive maintenance performed on a tool, and/or a variety of other factors as known in the art. The frequency of the model update may be on a wafer-by-wafer basis, lot-by-lot basis, process run-to-run basis, and/or any other frequency determined by the user.

Figure 3C:
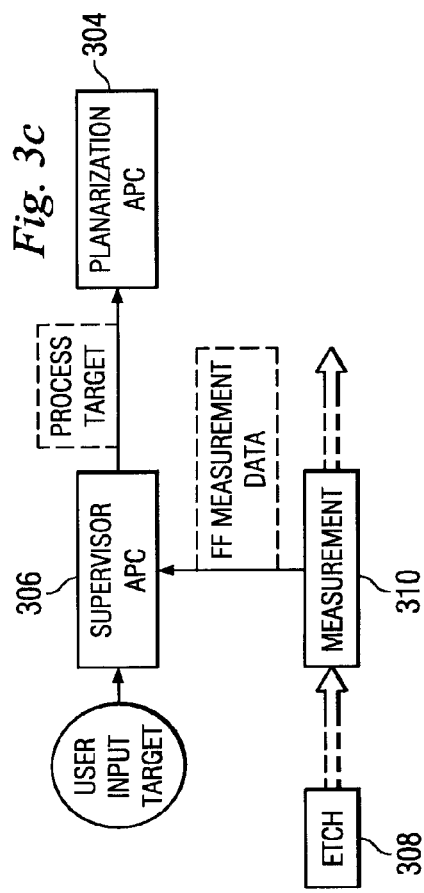

Referring in particular to FIGS. 3*a* and 3*c*, the measurement data from the post-etch measurement 310, described above with reference to FIGS. 3*a* and 3*b*, is used as feed-forward data and transmitted to Supervisor APC 306. The Supervisor APC 306 uses the measurement data to determine a wafer specific process target for the planarization process 316. In an embodiment, this process target includes the target thickness of the planarized metal layer that forms the interconnects. In an embodiment, the Supervisor APC 306 determines the process target using a model derived from experimental data. In an embodiment, the Supervisor APC 306 functions to control at least one specific process parameter affected by multiple process steps, such as, for example sheet resistance. In a further embodiment, the Supervisor APC 306 model describes the relationship between the specific process parameter and the dimensions of the metal interconnect.

Figure 3D:
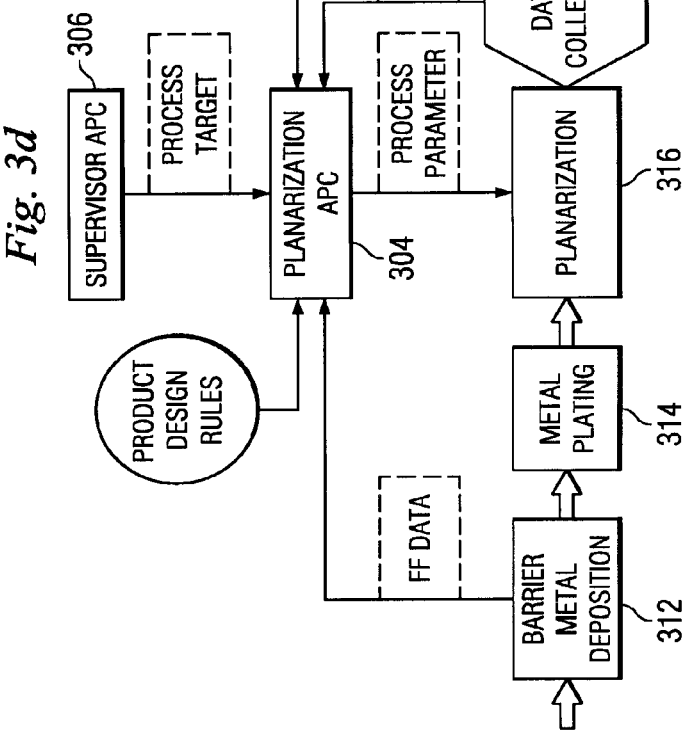

Referring in particular to FIGS. 3a and 3d, the process control method 300 Planarization APC 304 is illustrated in detail. In the illustrated embodiment, the material process flow continues from the post-etch measurement 310 to the deposition of the barrier/seed metal 312. In an embodiment, the barrier metal deposited is TaN, although other materials are possible and known in the art. After the seed/barrier metal process, the metal plating process 314 is completed. In an embodiment, the plating process 314 is copper plating by an enhanced electrochemical plating (ECP) process; however other metals and plating processes are possible and known in the art.

The Supervisor APC 306 passes the process target specific to the wafer, as described above with reference to FIGS. 2a and 2c, to the Planarization APC 304. The Planarization APC 304 determines a planarization process parameter required to substantially yield the process target. The planarization process parameter may include a parameter of the recipe that will be used to perform the planarization process 316, such as, polish time and/or pressure. The planarization process parameter is determined by the Planarization APC 304 using a model-based controller. In an embodiment, the planarization process parameter is determined by the Planarization APC 304 using a model-based, run-to-run controller. In an embodiment, the controller includes a part-effect model that may take into account the design rules for the wafer. The design rules may include the circuit pattern density and specific requirements for performance of the product being fabricated. In an embodiment, the controller includes a tool-effect model that may take into account process deviations particular to the tool. In an embodiment, the tool-effect model includes a time-factor model to predict the effect of the age of the pad that is to be used to planarize the wafer. In an embodiment, the planarization process 316 includes a multiple head tool and the tool-effect model includes compensating for head-specific deviations. In an embodiment, the Planarization APC 304 takes into account end-point detection that may be imbedded in the planarization process 316 at one or more planarization process steps, when determining the process parameter. In an embodiment, feed-forward data is received from the barrier/seed metal deposition process 312 that includes the density of the metal, allowing the Planarization APC 304 to compensate for deviations in the barrier/seed metal deposition process 312 when determining the planarization process parameter. In an embodiment, the Planarization APC 304 uses the properties and/or dimensions of an antireflective coating (ARC) layer deposited on top of the dielectric layer to determine the planarization process parameter. The Planarization APC 304 sends the process parameter to the planarization process 316, for example, to a tool such as the CMP tool 106, described above with reference to FIG. 1.

The Planarization APC 304 periodically updates the models used to determine the planarization process parameter using feedback data from the material process flow including feedback data from the planarization process 316 and the post-planarization measurement 318. The feedback data from the planarization process 316 may include process data, such as, the process parameter and the tool parameters used, including the age of the pad used and a designation of the tool sector, for example, a particular head of a CMP tool, where the processing occurred. The feedback data from the post-planarization measurement 318 may include measurements of the planarized metal layer. In an embodiment, the measurement 310 is performed on a Rudolph Metaplus or other such metrology tools as known in the art. In an alternative embodiment, the measurement is performed by metrology equipment embedded in the planarization tool, such as, for example, the CMP tool 106, described above with reference to FIG. 1. Upon receiving the feedback data, the Planarization APC 304 determines the difference between the feedback data, which illustrates the actual process output, and the model-predicted process output. The Planarization APC 304 uses this difference to update the model for use in determining a planarization process parameter for a subsequent wafer. In an embodiment, an EWMA is used to filter outlier data. The difference between the predicted and actual output may be a result of process drift due to, for example, the aging of the pad, preventive maintenance performed on the tool, and/or a variety of other factors as known in the art. The frequency of model update may be on a wafer-by-wafer basis, lot-by-lot basis, process run-to-run basis, and/or any other frequency determined by the user. In an embodiment, the post-planarization measurement 318 data may also be feed-forward data used in a subsequent process.

Referring now to FIG. 4, illustrated is process control method 400 which is one embodiment of the method of process control method 300, described above with reference to FIGS. 3a, 3b, 3c, and 3d. The process control method 400 provides control for a copper interconnect fabrication process, and in particular controls the copper interconnect Rs variation. In the embodiment, the etch process 308, as described above with reference to FIGS. 3a, 3b, and 3c, is a trench etch where a trench is etched in a dielectric layer, and the planarization process 316, as described above with reference to FIGS. 3a, 3c, and 3d, is a CMP process. The copper Rs may be highly dependant on the trench etch and CMP processes and the illustrated method 400 may be implemented to reduce the copper Rs variation by controlling at least these two processes and utilizing the Supervisor APC 306, described above with reference to FIGS. 3a and 3c, as a Cu-Rs Supervisor with a goal of minimizing copper Rs variation. The flowchart in FIG. 4 is but one embodiment of controlling copper Rs through the trench etch and CMP processes and other methods are possible; in addition the FIG. 4 flowchart may not be inclusive of all process steps.

The method 400 begins at step 402 where a wafer is at the trench etch process step awaiting processing by an etch tool, such as the etcher 104, described above with reference to FIG. 1. In step 404, the Trench Etch APC retrieves the chamber conditions from the etcher, design rules for the wafer, and the process target (e.g. the desired trench dimensions). In step 406, the trench etch APC controller determines the etch process parameter of trim time for the wafer through the use of the models. The Trench Etch APC then checks to ensure that the trim time is within the safe range for the process, as set by a user or determined by statistical process control, in step 408. If the trim time is not within the safe range, in step 410 the Trench Etch APC alarms and user interaction is required. The safe range may reduce the opportunity for misprocessing a wafer using a miscalculated process parameter. If the trim time is within the safe range, in step 412 the Trench Etch APC assigns the trim time, taking into account the particular effect of the chamber the wafer will be processed in, to the etch process. In step 414, the trench is etched in the dielectric of the wafer. After processing the wafer, in step 416 the Trench Etch APC collects from the etch process the trim time performed and the chamber used for the wafer. After the etch process, step 420 provides an optical measurement of the wafer including the depth of the trench, and the critical dimension (width) of the trench, as well as the thickness of an antireflective coating (ARC) located on the dielectric. This measurement data is then collected by the Trench Etch APC in step 422. In step 424, the Trench Etch APC uses the measurement data to calculate the error for the model used to determine the process parameter of trim time. The error in the model is the difference between the model prediction and the actual output of the process, which is found in the feedback data including the measurement data from step 422 and the process data from step 416. The Trench Etch APC in step 426 updates the model for use in determining the trim time for subsequent wafers. The measurement data taken in step 420 is also passed to the Cu-Rs Supervisor in step 428 for use in determining the final target thickness of the copper interconnect layer for the wafer on which the measurements were taken, as described below. The method 400 continues to step 430; step 430 is illustrative of additional processes performed on the wafer including, but not limited to, barrier metal deposition and copper plating.

The method 400 continues to step 432 where the wafer is ready for the Cu CMP process step awaiting processing by a CMP tool, such as the CMP tool 106, as described above in reference to FIG. 1. In step 434, Cu-Rs APC determines the CMP process target for the wafer which is the optimum thickness for the copper layer post-CMP processing. The copper thickness is determined using a model of Rs. In an embodiment, the model is experimentally determined and describes the relationship between the copper dimensions and Rs. In an embodiment, Rs is a function of the inverse of the area of the copper interconnect (such that an increase in area will decrease the Rs). A target value for Rs is obtained from user input and an inverse of the model ran to find the desired area. The area is a function of the critical dimension of the trench, as measured in step 420, and thickness of the copper interconnect layer. Then solving for the thickness required to meet the Rs goal, in step 436, the Cu-Rs Supervisor APC passes the target copper thickness to the Cu CMP APC.

The Cu CMP APC in step 438 obtains the additional data needed by the model-based controller to determine the process parameter for the CMP process. This data includes the tool condition, design rules for the wafer, and the pad age effect model parameters. The Cu CMP APC, in step 440, runs the models to determine the process parameter of polish time for the Cu CMP process. In step 442, the Cu CMP APC checks the polish time to ensure that an outlier is not sent to the CMP tool, as such reducing the opportunity for a misprocessed wafer. In step 442, if the calculated polish time is outside of a limit, which may be set by a user or statistical process control techniques, the polish time is adjusted to be the limit in step 444. The method 400 continues to step 446 where the Cu CMP APC assigns the polish time to the CMP tool for processing. In an embodiment, the Cu CMP APC may assign additional process parameters such as, for example, pressure applied by the CMP tool head. In step 448, the CMP process is performed using the determined polish time. In the illustrated embodiment, the CMP process includes three platens. The platen 1 process, step 450a, is controlled by endpoint detection. The endpoint detection may allow variations from the plating process to be removed. In an embodiment, the platen 2 process, step 450b, is controlled by endpoint detection. In an alternative embodiment, the platen 2 process, step 450b, is controlled by the Cu CMP APC determined process parameter. The platen 3, step 450c, is controlled by the Cu CMP APC determined process parameter. After completion of the CMP process, in step 452 the Cu CMP APC collects the process data from the CMP process. The process data may include the polish time used, the pad life for the pads used for the process, and a designator of the head used to process the wafer. The wafer is moved to step 454 where the remaining copper thickness is measured and collected by the Cu CMP APC in step 456. The Cu CMP APC uses the feedback data of the copper thickness measurement and the process data gathered in step 452 to calculate the error in the model that generates the polish time. The error in the model is the difference between the model prediction and the actual output as shown by the feedback data. The Cu CMP APC in step 460 updates the model for use with the next wafer. The wafer moves to the next process step in step 462.

Although only a few exemplary embodiments of this invention have been described in detail above, those skilled in the art will readily appreciate that many modifications are possible in the exemplary embodiments without materially departing from the novel teachings and advantages of this disclosure.

In one embodiment, an advanced process control (APC) method for semiconductor fabrication is provided. A first substrate and a second substrate are provided. The first substrate and the second substrate include a dielectric layer. A first etch process parameter for the first substrate is determined. A trench is etched in the dielectric layer of the first substrate using the first etch process parameter. At least one aspect of the etched trench of the first substrate is measured. The measured aspect is used to determine a second etch process parameter for the second substrate and to determine a planarization process parameter for the first substrate.

In another embodiment, a method for controlling Rs variation in semiconductor fabrication is provided. A first wafer and a second wafer are provided. The first wafer and the second wafer include a dielectric layer. A first etch process parameter for the first wafer is determined. A trench is etched in the dielectric layer of the first wafer using the first etch process parameter. At least one dimension of the etched trench of the first wafer is measured. A second etch process parameter for the second wafer is determined using the measured dimension of the etched trench of the first wafer. A first planarization process parameter for the second wafer is determined using the measured dimension of the etched trench of the first wafer. Metal is deposited on the first wafer. The first wafer including the deposited metal is planarized using the determined first planarization process parameter. The thickness of the deposited metal on the first wafer after planarizing is measured. A second planarization process parameter for the second wafer is determined based on the thickness of the deposited metal on the first wafer after planarizing.

In another embodiment, a computer comprising at least one model-based run-to-run controller is provided. The computer is operable to receive a first dataset regarding a first wafer after a first process. It is further operable to determine a process parameter for the first process for a second wafer using the first dataset. It is yet further operable to determine a second process parameter for a second process for the first wafer using the first dataset.

What is claimed is:

1. A computer comprising a recordable medium on which is stored instructions for at least one model-based, run-to-run controller routine operable to:
   receive a first dataset regarding a first wafer after a first process;
   determine a first process parameter for the first process for a second wafer using the first dataset; and
   determine a second process parameter for a second process for the first wafer using the first dataset, wherein the determining the second process parameter uses a tool effect model and a part effect model that includes design rules including circuit pattern density and device performance requirements associated with the first wafer.

2. The computer of claim 1, wherein the first process is an etch process.

3. The computer of claim 1, wherein the second process is a planarization process.

4. The computer of claim 1, wherein the instructions further comprise receiving a second dataset regarding the first wafer after the second process; and determining a second process parameter for the second process for the second wafer using the second dataset.

5. The computer of claim 1, wherein the first process parameter is trim time.

6. The computer of claim 1, wherein the second process parameter is polish time.

7. The computer of claim 1, wherein the tool effect model includes a model of a first chamber of a multiple chamber etch tool.

8. A computer comprising a recordable medium on which is stored instructions for at least one model-based, run-to-run controller routine operable to:
    collect a value for a first etch process parameter for a first substrate, wherein the first process parameter is associated with etching a trench in the first substrate;
    collect a measurement of the trench etched in the first substrate using the first process parameter;
    determine a trim time for a second substrate using the collected measurement of the etched trench of the first substrate;
    collect a target sheet resistance; and
    determine a planarization process parameter for the first substrate using the collected measurement of the etched trench of the first substrate, a part effect model including design rules associated with a device formed on the first substrate, and the target sheet resistance.

9. The computer of claim 8, wherein the controller controls a damascene copper interconnect fabrication process.

10. The computer of claim 8, wherein the first etch process parameter includes a trim time.

11. The computer of claim 8, wherein the collected measurement includes at least one of a trench critical dimension and a trench depth.

12. The computer of claim 8, further comprising instructions to:
    send the trim time for the second substrate to an etch tool.

13. The computer of claim 8, wherein the determining the second etch process parameter also uses a tool-effect model.

14. A system comprising:
    a first measurement apparatus to measure at least one dimension of a trench of the first wafer;
    a second measurement apparatus to measure at least one dimension of a barrier metal;
    a run-to-run controller including instructions to:
        collect the measured dimensions from the first and second measurement apparatus;
        determine a second etch process parameter for the second wafer using the measured dimension of the trench of the first wafer;
        determine a first planarization process parameter for the first wafer using the measured dimension of the etched trench of the first wafer, the measured dimension of the barrier metal, a target value for sheet resistance (Rs), and a tool-effect model, wherein the tool-effect model includes a model for the age of a polishing pad of a CMP tool, wherein the model for the age of the polishing pad is used to determine the first planarization process parameter; and
        send the first planarization process parameter to a planarization apparatus; and
    the planarization apparatus to planarize the first wafer using the determined first planarization process parameter.

15. The system of claim 14, wherein the controller further comprises instructions to:
    determine a second planarization process parameter for the second wafer based on the thickness of the first wafer after the planarizing using the first planarization process parameter.

16. The system of claim 14, wherein the planarization apparatus is a chemical mechanical polish tool and the determined first planarization parameter includes polish time.

17. The system of claim 14, wherein the run-to-run controller further includes a part-effect model that includes design rules associated a device disposed on the first wafer.

18. The system of claim 14, further comprising:
    an etching system, wherein the etching system etches the second wafer using the second etch process parameter.

19. The system of claim 18, wherein the etching system etches a trench.

20. A computer comprising a recordable medium on which is stored instructions for at least one model-based, run-to-run controller routine operable to:
    receive a first dataset regarding a first wafer after a first process;
    receive a target sheet resistance (Rs) value
    determine a first process parameter for the first process for a second wafer using the first dataset; and
    determine a second process parameter for a second process for the first wafer using the first dataset, wherein the determining the second process parameter uses a tool effect model and a part effect model that includes design rules associated with the first wafer; and wherein the determining the second process parameter includes using the target Rs value.

* * * * *